United States Patent
Salour et al.

(10) Patent No.: US 11,695,684 B1
(45) Date of Patent: *Jul. 4, 2023

(54) DATA COMMUNICATION ROUTING ARCHITECTURE BASED ON TIME ZONE AND RECONFIGURATION

(71) Applicant: 8x8, Inc., Campbell, CA (US)

(72) Inventors: Mehdi Salour, Campbell, CA (US); Raghu Rengarajan, Campbell, CA (US); Bryan R. Martin, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/365,731

(22) Filed: Jul. 1, 2021

Related U.S. Application Data (63) Continuation of application No. 16/438,075, filed on Jun. 11, 2019, now Pat. No. 11,057,296.

(51) Int. Cl.
*H04M 3/51* (2006.01)
*H04L 12/733* (2013.01)
(Continued)

(52) U.S. Cl.
CPC ............ *H04L 45/126* (2013.01); *H04L 45/22* (2013.01); *H04L 67/52* (2022.05); *H04M 3/5116* (2013.01);
(Continued)

(58) Field of Classification Search
None
See application file for complete search history.

(56) References Cited

U.S. PATENT DOCUMENTS

| | | |
|---|---|---|
| 5,594,791 A | 1/1997 | Szlam et al. |
| 9,432,519 B1 | 8/2016 | Liu et al. |

(Continued)

FOREIGN PATENT DOCUMENTS

| | | |
|---|---|---|
| GB | 2487734 B | 8/2012 |

OTHER PUBLICATIONS

8x8, Inc. U.S. Appl. No. 16/351,339, filed Mar. 12, 2019 The Examiner is respectfully referred to the copending patent prosecution of the common Applicant/Assignee. No Attachment.

(Continued)

*Primary Examiner* — Chirag G Shah
*Assistant Examiner* — Amarnauth G Persaud
(74) *Attorney, Agent, or Firm* — Crawford Maunu PLLC (57) ABSTRACT

Certain aspects of the disclosure are directed to routing data communications based on time zone. According to a specific example, a data-communications system for routing data communications based on time zone includes a communications routing circuit and a processing circuit. The communications routing circuit receives and routes data communications to a plurality of data communications stations and provides data communications services to remotely-situated client entities. For data communications routed for client entities in which a time zone routing feature is applied, the processing circuit determines a geographic location of the respective data communications station. The processing circuit then identifies a respective set of routing functions, based on a time zone of the geographic location, and routes the data communication based on the time zone, and according to the respective set of routing functions.

17 Claims, 4 Drawing Sheets

(51) Int. Cl.
    *H04L 29/08*     (2006.01)
    *H04L 45/12*     (2022.01)
    *H04M 7/00*     (2006.01)
    *H04L 45/00*     (2022.01)
    *H04L 67/52*     (2022.01)

(52) U.S. Cl.
    CPC ....... *H04M 3/5166* (2013.01); *H04M 3/5191* (2013.01); *H04M 7/0075* (2013.01)

(56) References Cited

U.S. PATENT DOCUMENTS

| | | |
|---|---|---|
| 2007/0172050 A1 | 7/2007 | Weinstein et al. |
| 2008/0091516 A1 | 4/2008 | Giunta |
| 2009/0196411 A1 | 8/2009 | Hawkins |
| 2009/0262909 A1* | 10/2009 | DiVenuta ............... G16H 20/10 379/88.18 |
| 2010/0082801 A1 | 4/2010 | Patel et al. |
| 2012/0027197 A1 | 2/2012 | Zgardovski et al. |
| 2013/0110614 A1 | 5/2013 | Wagner et al. |
| 2013/0151332 A1 | 6/2013 | Yan et al. |
| 2014/0136233 A1 | 5/2014 | Atkinson et al. |
| 2014/0289017 A1 | 9/2014 | Trenkle et al. |
| 2014/0334472 A1 | 11/2014 | Zhang et al. |
| 2016/0021250 A1 | 1/2016 | Kumar et al. |
| 2016/0100053 A1 | 4/2016 | Wong et al. |
| 2016/0309032 A1* | 10/2016 | Patel ................... H04M 3/5166 |
| 2016/0350663 A1* | 12/2016 | McCord ................ G06N 7/005 |
| 2017/0264743 A1 | 9/2017 | Kocan |
| 2017/0272574 A1 | 9/2017 | Zhakov |
| 2018/0007202 A1 | 1/2018 | Batlle |
| 2018/0226071 A1* | 8/2018 | Winter .................. G10L 15/197 |
| 2019/0028587 A1* | 1/2019 | Unitt ....................... G06F 9/453 |
| 2020/0090123 A1* | 3/2020 | Richardson ........... H04L 65/403 |
| 2020/0252510 A1* | 8/2020 | Ghuge ................... G06F 40/40 |

OTHER PUBLICATIONS

8x8, Inc. U.S. Appl. No. 16/351,351, filed Mar. 12, 2019 The Examiner is respectfully referred to the copending patent prosecution of the common Applicant/Assignee. No Attachment.

8x8, Inc. U.S. Appl. No. 16/351,347, filed Mar. 12, 2019 The Examiner is respectfully referred to the copending patent prosecution of the common Applicant/Assignee. No Attachment.

\* cited by examiner

DATA COMMUNICATION ROUTING ARCHITECTURE BASED ON TIME ZONE AND RECONFIGURATION

OVERVIEW

Particular embodiments are directed toward methods for use in communications systems employing a data communications server operated by a communications provider, where the data communications server is on the data communications provider side, to provide data communications services to a multitude of client entities. A data communications endpoint device can use a broadband Internet connection to connect to a data communications server that is managed by a data communications service provider. The data communications server can handle communication routing and provide other data communications services for the data communications endpoint device. Such server(s) operating on behalf of data-communications service providers, provide users access to managed databases and/or services over the high throughput mediums.

Computing servers are increasingly being used to provide various data communications services over a network including, but not limited to, routing of Voice over Internet Protocol (VoIP) communications and/or for providing communications services such as messaging, video conferencing, management of data communications exchange servers, packet switching, traffic management, website hosting, remote data storage, remote computing services, and management of virtual computing environments, among other examples.

SUMMARY

Various example embodiments are directed to issues such as those addressed above and/or others which may become apparent from the following disclosure concerning routing data communications based on the time zone of a data communications station, and according to respective user-configured routing policies implemented based on a change of time zone of the data communications station.

In certain example embodiments, aspects of the present disclosure involve a data communications system including a communications routing circuit and a processing circuit. In such embodiments, the communications routing circuit is configured and arranged to receive and route data communications to a plurality of data communications stations and provide data communications services to a plurality of remotely-situated client entities. Each of the client entities is associated with a respective set from among the plurality of data communications stations. The processing circuit is configured and arranged to log data communications routed by the communications routing circuit, and for each data communication routed by the communications routing circuit for a client entity in which a time-zone routing feature is applied, route the data communications based on the time zone of the data communications station.

In a more specific example embodiment, the communications routing circuit is configured and arranged to receive and route data communications to a plurality of data communications stations and to provide data communications services to a plurality of remotely-situated client entities. Each of the client entities is associated with a respective set from among the plurality of data communications stations. The processing circuit is configured and arranged to log data communications routed by the communications routing circuit. For each data communication routed by the communications routing circuit for a client entity in which a time zone routing feature is applied, a number of steps are performed. For instance, the processing circuit is configured and arranged to determine, in response to receipt of a data communication intended for a respective one of the data communications stations of the client entity, a geographic location of the respective data communications station. The processing circuit is configured and arranged to identify a respective set of routing functions in a policy associated with the respective data communications station, based on a time zone of the geographic location. Moreover, the processing circuit is configured and arranged to route the data communication based on the time zone of the data communications station, and according to the respective set of routing functions associated with the respective data communications station. In a number of embodiments, the set of routing functions may include a routing function that responds to a change in a respective time zone, such as for Daylight Saving Time.

In another specific example embodiment, the communications routing circuit is configured and arranged to receive and route data communications to a plurality of data communications stations, each data communications station having a respective identifier. The processing circuit is configured and arranged to log data communications routed by the communications routing circuit, and for each data communication routed by the communications routing circuit for a client entity in which a time zone routing feature is applied, a number of processes are performed. For instance, the processing circuit is configured and arranged to determine, in response to receipt of a data communication intended for a respective one of the plurality of data communications stations, a geographic location of the respective data communications station. Using a respective set of routing functions in a policy associated with the data communications station, the processing circuit is configured and arranged to determine whether the data communication is permissible or impermissible based on a time zone of the geographic location of the data communications station at a time of the data communication. Further, the processing circuit is configured and arranged to route the data communication based on the time zone of the data communications station, and according to the respective set of routing functions associated with the data communications station.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving routing data communications based on the time zone of a data communications station, and according to respective user-configured routing policies implemented based on a change of time zone of the data communications station. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

Example embodiments are directed toward methods for use in communications systems employing a data communications server operated by a communications provider, where the data communications server is on the data communications provider side, to provide data communications services to a multitude of client entities. For instance, the data communications server can enable and facilitate data communications sessions each involving a client-specific endpoint and another participating endpoint, where the client-specific endpoint is associated with a client-entity among a plurality of remotely-situated client entities. In such contexts, the data communications server may be referred to as a data-center communications server. In such systems, the data-center communications server includes one or more computer processor circuits (configured with access to databases stored in memory circuits) configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues. Each such data communications session can include transmission and receipt of data communications between at least two endpoints, as hosted (e.g., provided) by the data-center communications server.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In various example embodiments, a data-communications system including at least a communications routing circuit and a processing circuit are configured and arranged to route data communications based on the time zone of a data communications station, and according to respective user-configured routing policies implemented based on a change of time zone of the data communications station. In such embodiments, the communications routing circuit is configured and arranged to receive and route data communications to a plurality of data communications stations and provide data communications services to a plurality of remotely-situated client entities. Each of the client entities is associated with a respective set from among the plurality of data communications stations. The processing circuit is configured and arranged to log data communications routed by the communications routing circuit, and for each data communication routed by the communications routing circuit for a client entity in which a time zone routing feature is applied, a number of processes and/or steps may be executed by the processing circuit. As used herein, a time zone routing feature refers to or includes a data communications service provided by a data communications service provider, allowing users to specify a manner in which data communications are routed and/or handled based on a change of time zone of a data communications station.

Although embodiments are not limited to time zone-based routing, and a number of example embodiments may include, in addition or in alternative to a time zone routing feature, a geographic-based routing feature. A geographic-based routing feature refers to or includes a data communication service provided by a data communications service provider, allowing users to specific a manner in which data communications are routed and/or handled which is based on the geographic location of the data communications station, and may be irrespective of a time zone change, as further described herein.

Clients of the communications service provider can purchase the time zone routing feature, such that data communications sent to data communications stations associated with that client are routed and/or handled based on the time zone of a data communications station and/or a change of time zone of the data communications stations. In various embodiments, the time zone routing feature can be configured by a client entity policy and/or a data communications station policy. The client entity policy includes default communications routing policies to be implemented based on a change of time zone and the data communications station policy includes user-configured routing policies to be implemented based on a change of time zone of the data communications station. In such a manner, the time zone routing feature can be configured by a client to include default communications routing policies, and individual users and/or devices can be configured with different and/or additional communications routing policies to provide user-configured routing policies implemented based on a change of time zone of the data communications station.

In some example embodiments, the processing circuit is configured and arranged to, for each data communication routed by the communications routing circuit for a client entity in which a time zone routing feature is applied, perform and/or execute a number of processes and/or steps. For instance, the processing circuit can determine, in response to receipt of a data communication intended for a respective one of the data communications stations of the client entity, a geographic location of the respective data communications station. The processing circuit can identify a respective set of routing functions in a policy associated with the respective data communications station, based on a time zone of the geographic location, and route the data communication based on the time zone of the data communications station and according to the respective set of routing functions associated with the respective data communications station.

To identify when to implement routing and/or handling processes specified in a time zone routing feature, a geographic location of the data communications stations may be identified and/or monitored, and specified routing and/or handling processes can be implemented based on the geographic location. For instance, in some embodiments, the processing circuit can track the geographic location of data communications stations of the client entity. In response to receipt of a data communication, the processing circuit can identify a set of routing functions in a policy associated with the client entity, and automatically implement the client entity policy and/or the data communications station policy to route the data communication. As discussed above, the client entity policy can include default communications routing policies to be implemented based on a change of time zone and the data communications station policy includes user-configured routing policies to be implemented based on a change of time zone. In such a manner, each client entity and each communications device associated with the client entity, can be configured to implement different routing rules and/or policies when communications stations move between different time zones.

As a further illustration, the processing circuit can be configured and arranged to, in response to a determination that a local time at which the data communication is received by the respective data communications station is within a window of time specified in the policy associated with the respective data communications station policy and/or client entity policy, intercept the data communication and provide a text-based virtual assistant to address the data communication. For instance, a user can specify that when they travel to time zones that are a threshold different from their normal (e.g., typical) time zone, such as 8 hours ahead or 8 hours behind, data communications received outside of local working hours are intercepted. Once intercepted, the individual and/or entity attempting to communicate with the data communications station outside of local working hours, is provided with a text-based virtual assistant that is configured and arranged to address and/or respond to the data communication. The text-based virtual assistant can present questions about the nature of the communication, such as whether it is an emergency, whether it relates to particular projects, among others. Clients and/or the individual users associated with the respective data communications stations can specify questions, prompts and/or analyses performed by the virtual assistant.

In various example embodiments, client-specific preferences can specify a manner in which communications are handled and/or routed, based on a determined local time zone of the data communications device. For instance, the processing circuit can determine a geographic location of the data communications station, as discussed above, and determine a local time zone (e.g., from the geographic location). Responsive to receipt of a data communication intended for the data communications station, the local time at which the data communication is received by respective data communications station is determined. The local time is then compared to a data communications station policy and/or client entity policy and handled accordingly. Using the determined geographic location of the respective data communications station, the processing circuit can apply a different respective set of routing functions to the data communication based on the determined local time.

Additional and/or different communications services can be provided by the processing circuit based on the determined time zone of a particular data communications station. For instance, the processing circuit can be configured and arranged to, in response to a determination that a local time at which the data communication is received by the respective data communications station is within a specified window of time, such as outside of specified working hours, intercept the data communication and provide an interactive voice recognition (IVR) system to address the data communication. As an illustration, when an individual and/or an organization attempts to contact the data communications station outside of those specified working hours (as determined by the local time zone), the processing circuit can route the data communication to a messaging system in response to answers received by the IVR system satisfying a first set of criteria specified by a client entity associated with the respective data communications station. For instance, the IVR system can ask the individual or organization attempting to contact the data communications station, whether the communication is of an urgent nature. If the communication is not of an urgent nature, then the communication can be routed to a messaging system such as a voice message system and/or an email system, among other examples.

In various example embodiments, the communications routing circuit is configured and arranged to provide data communications services to a plurality of remotely-situated client entities, and each of the plurality of remotely-situated client entities are associated with at least one of the plurality of data communications stations. For instance, a client entity having a number of employees, can provide each employee with data communications stations such as mobile phones. The client entity can specify particular communications routing policies for the employees, as well as normal working hours for each employee. The client entity can further specify how data communications which are received outside of normal working hours are to be handled. For instance, a communications routing policy can specify that data communications received outside of normal working hours are to be routed to a different data communications station associated with the client entity in response to answers received by the IVR system satisfying a policy associated with the client entity.

In response to receipt of a data communication, the communications routing circuit can identify to which of the plurality of remotely-situated client entities the data communication is addressed, to which respective data communications station the data communication is addressed, and communications policies for the client entity and the data communication station. In various example embodiments, a data communication station does not have a specified communications routing policy, in which case a communications routing policy of the client entity can be used by default. For instance, a client entity can provide a default communications routing policy which specifies the local time zone of a particular data communication station, normal communication routing processes to be implemented for the particular data communication station, normal working hours associated with the data communication station, and routing policies to be implemented outside of the normal working hours. Additionally, the policy of the client entity can specify different routing policies to be implemented when the data communication station is outside of the normal time zone. A particular user associated with the data communication station can specify in a policy associated with the data communications station additional and/or alternative routing processes to be implemented. For instance, the data communications station policy can specify particular time zones in which particular routing processes are to be implemented. A user can specify a threshold change in time upon which such routing processes are implemented. For instance, an alternative routing process can be implemented when the data communications station is plus or minus 4 hours from the normal time zone. Similarly, a user can specify different handling processes outside of normal working hours. For instance, an IVR system can intercept the data communication and inquire about the nature of the communication and/or whether it is urgent. A text-based system can intercept the data communication and also inquire about the nature of the communication and/or whether it is urgent. Based on the answers to the various questions and/or prompts provided by the IVR system or the text-based system, the data communication can be routed to a different data communications station (e.g., to a different user), to a messaging system, and/or provided to the intended data communications station.

As an illustration, the processing circuit can route data communications to a messaging system in response to answers received by the text-based virtual assistant satisfying a set of criteria specified in the policy associated with the respective data communications station or the policy of the client entity. As an additional illustration, the processing circuit can route the data communication to a different data communications station associated with the client entity in response to answers received by the text-based virtual assistant satisfying a set of criteria specified in the policy associated with the respective data communications station or the policy of the client entity.

In some example embodiments, data communications can be routed to and from a plurality of data communications stations, each data communications station having a respective identifier. In such embodiments, a processing circuit can, for each data communication routed by the communications routing circuit for a client entity in which a time-zone routing feature is applied, perform a number of processes. For instance, the processing circuit can determine, in response to receipt of a data communication intended for a respective one of the plurality of data communications stations, a geographic location of the respective data communications station. The data communications include an alert, a call, a text message, an email notification, or various combinations thereof, each of which can provide a form of notification on the receiving data communication device. Such notifications can be disruptive, for instance, if the recipient is in a different time zone and sleeping. As discussed above, the processing circuit can identify a respective set of routing functions in a policy associated with the respective data communications station, based on a time zone of the geographic location, and route the data communication based on the time zone of the data communications station, and according to the respective set of routing functions associated with the respective data communications station.

In various embodiments, the processing circuit is configured and arranged to receive and route data communications on behalf of a plurality of client entities, in which each respective client entity includes a subset of the plurality of data communications stations configured and arranged to transmit and receive data communications from other data communications stations. The routing functions are configurable by each respective client entity to include a default time zone for each respective data communications station associated with the client entity. Additionally and/or alternatively, the processing circuit can be configured and arranged to implement default routing functions specified by a provider of the data communications services on behalf of each respective data communications station. For instance, the data communications provider can, for a fee, provide to clients default communications routing functions which automatically handles data communications based on time zone.

As discussed herein, each client entity can specify communication handling processes to be implemented within normal time zones and when outside of normal time zones. For instance, the respective set of routing functions associated with the data communications station policy can specify different routing functions for internal data communications received from communications stations from the same client entity versus communications stations from external client entities. In such a manner, an employee of ABC Company can specify that communications received from other employees of ABC company outside of normal working hours are handled in one manner (e.g., sent to a messaging system), whereas communications received from external clients (e.g., persons outside of ABC company) are sent directly to the data communications station (e.g., sent directly to the user).

As another illustration, the respective set of routing functions associated with the data communications station can specify different routing functions for data communications received from communications stations with particular identifiers. For instance, an employee (e.g., user) of ABC Company may have high profile clients which call, email, and/or text the employee at various times throughout the day. The employee may find it important to receive all communications from the high profile client when they call, email, and/or text. Accordingly, the employee (e.g., user) can provide identifiers associated with the high profile client, and specify in the communications station policy that data communications received from that particular high profile client will be sent to the employee regardless of where the employee is and which time zone they are in.

In various embodiments, the data communications station policy is identified by the respective identifier of the data communications station. Identifiers can include phone numbers, email addresses, and/or device identifiers, among others.

In another example embodiment, the processing circuit is configured and arranged to log data communications routed by the communications routing circuit, and for each data communication routed by the communications routing circuit for a client entity in which a time zone routing feature is applied, use a respective set of routing functions in a policy associated with the data communications station to determine whether the data communication is permissible or impermissible based on a time zone of the geographic location of the data communications station at a time of the data communication. Whether the communication is permissible or impermissible can be identified based on a data communications station policy, and/or a client entity policy, and based on the time zone of the data communications station.

In yet further embodiments, the processing circuit can utilize artificial intelligence and/or machine learning to route the data communication based on the time zone of the data communications station, and according to the respective set of routing functions associated with the data communications station. For instance, the processing circuit can identify a topic of the data communication through the use of an IVR system and/or a text-based virtual assistant. The processing circuit can determine a local time at which the data communication is received by a data communications station, and route the data communication based on the determined local time, the identified topic of the data communication, and according to the respective set of routing functions associated with the data communications station. In such a manner, communications deemed important, or similar in nature to important topics, can be sent directly to the client regardless of the determined local time, whereas communications deemed of lesser importance can be handled by a messaging system or the like.

As another illustration, the processing circuit can identify a sentiment of the data communication. The sentiment of the data communication can be determined based on speech characteristic parameters, identification of written words, use of capital letters in written words, punctuation, and/or combinations of the above. The processing circuit can further route the data communication based on the determined local time, the identified sentiment of the data communication, and according to the respective set of routing functions associated with the data communications station. As such, the processing circuit is configured and arranged to use machine learning to identify topics and/or sentiments of data communications that are associated with particular routing functions associated with the data communications station. In such exemplary embodiments, the processing circuit routes the data communication based on the determined local time, according to the respective set of routing functions associated with the data communications station, and in response to a determination that the topic or sentiment of the data communication satisfied criteria of the policy associated with the data communications station.

In further embodiments, the processing circuit is configured and arranged to identify the data communication as pertaining to an emergency alert for the geographic location of the data communications station at the time of the data communication. For instance, different geographic regions can have different emergency alert systems, and different types of emergencies which users are notified of. In such embodiments, the processing circuit is configured and arranged to identify a communication as a locally identified emergency alert, and override the policy associated with the data communications station. As such, notifications which may otherwise be handled according to the user-specified policy (e.g., the policy associated with the data communications station) are routed to the data communications station in response to the identification that the data communication pertains to an emergency alert.

Figure 1:
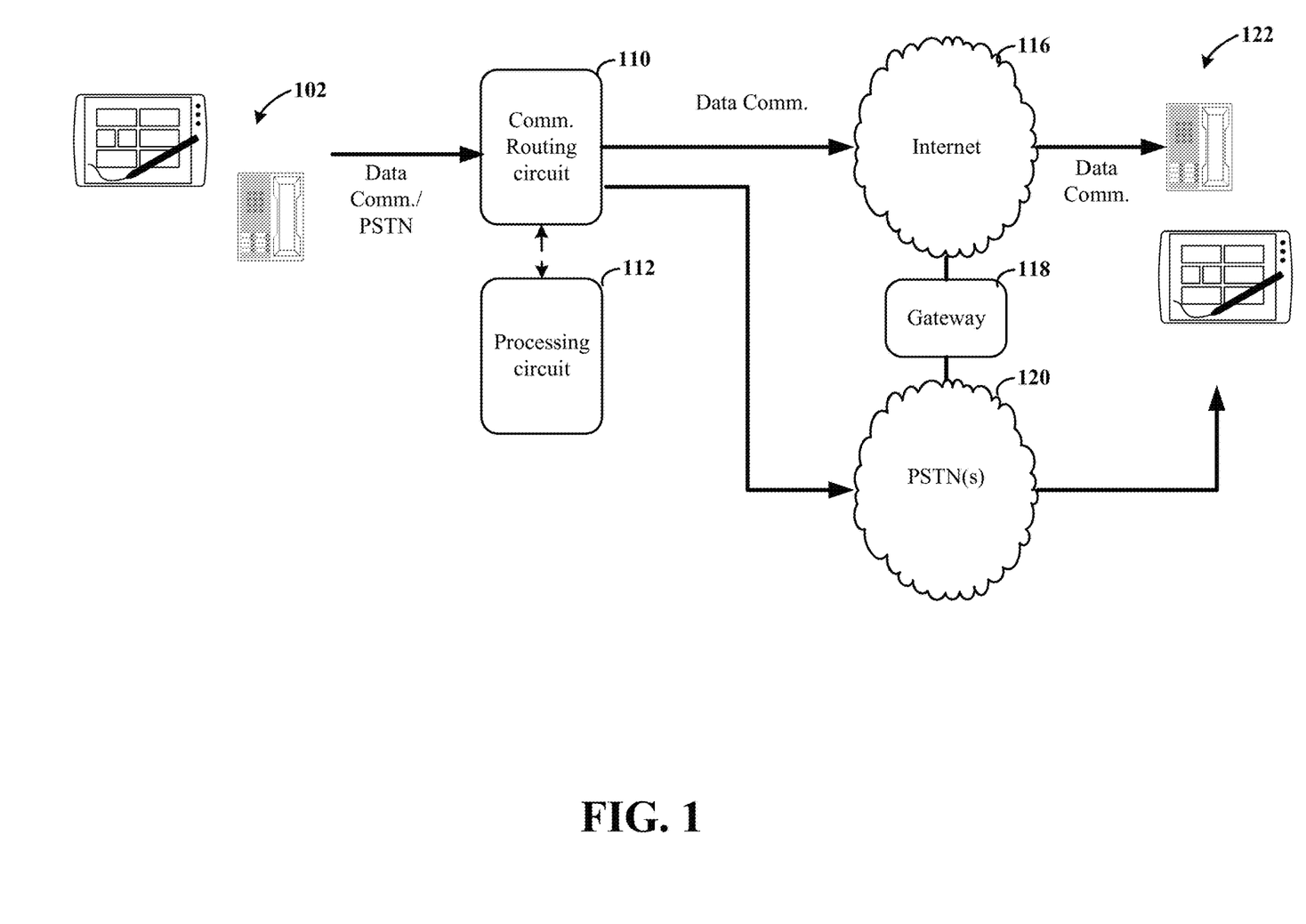
FIG. 1 illustrates an example system for communicating phone calls and/or data communications from a source station to a destination station, in accordance with the present disclosure.

Turning now to the figures, FIG. 1 illustrates an example system for communicating phone calls and/or data communications from a source station to a destination station, in accordance with the present disclosure. The source stations 102 and destination stations 122 shown in FIG. 1 are each one of a plurality of different types of data-communication devices including, for example, mobile devices, POTS, and/or IP-phones, among others. Data communications are routed from source devices 102 to destination devices 122 via the communication routing circuit 110 and processing circuit 112, such as may be provided by one of a plurality of service providers available to the source stations 102. For example, in some embodiments, each of the service providers includes a respective communications-routing circuit 110 and a respective processing circuit 112, which are configured to route data communications received from a source station 102 over one or more networks (e.g., public switched telephone networks (PSTNs) 120 and/or the internet 116) to an applicable one of the destination stations 122. In the example shown in FIG. 1, one or more of the service providers are configured to route data communications over one or more PSTN networks 120. Similarly, one or more of the service providers are configured to route data communications over the internet 116. Data communications to data communications stations may be routed, for instance, over the internet 116 directly to a destination station. Similarly, data communications may be routed, for instance, over the internet 116 to a gateway 118 in the location of a destination station. The gateway 118 routes the data communication over one or more PSTN networks to a destination device 122.

The system includes a processing circuit 112 for routing the data communication based on the time zone of a data communications station associated with a client account, and according to the respective set of routing functions associated with the data communications station. In some embodiments, the processing circuit 112 is configured to identify data communications from ones of the source stations 102 associated with a client account that are routed by one or more of the service providers. According to such embodiments, in response to receipt of a data communication intended for a respective one of the data communications stations of the client entity, the processing circuit 112 determines a geographic location of the respective data communications station. For instance, in various embodiments the processing circuit 112 determines the geographic of the data communications station using a global positioning system or other geolocation system.

In various example embodiments, the processing circuit 112 is configured to identify a respective set of routing functions in a policy associated with the respective data communications station, based on a time zone of the geographic location. In response to identifying the geographic location of the communications station, the applicable time zone for the communications station is identified. This time zone is compared against the typical, or default, time zone for the communications station to determine if different and/or particular communication handling processes are to be implemented, based on the determined time zone. Each respective communications station can be configured with a typical (e.g., default) time zone corresponding with the normal time zone where the communications station is located. Geographic locations with time zones outside of the typical time zone for the communications station can be configured, such that when the communications station is in a different time zone, different and/or particular communication handling processes can be implemented. For instance, a user can specify that outside of normal working hours, all data communications are to be handled according to user-specified rules, regardless of which time zone the data communications device is in. As an additional illustration, a user can specify that normal data handling (e.g., routing) rules are to be applied to all data communications, except for those data communications received while the communications device is located in specific time zones. Yet further, a user can specify a schedule of time zones constituting the typical time zone, such as when the communications device moves between time zones on a scheduled basis. Rules of various granularity can be implemented, such that each individual can specify communication routing processes to be implemented when the communications device is outside of the typical time zone, as specified in user-configurable rules. In a specific embodiment, the set of routing functions include one or more routing functions that specify rules for handing communications in response to or based on a change in a respective time zone, such as for Daylight Saving Time.

For instance, in various embodiments, a plurality of data communications stations are associated with a client entity. The processing circuit 112 can track the geographic location of data communications stations of the client entity, and in response to receipt of a data communication, identify a set of routing functions in a policy associated with the client entity. For instance, the client entity itself can specify communication routing processes to be implemented outside of the typical time zone for the communications device. As an illustration, routing functions in the policy associated with the client entity can specify that while a communications device is outside of the typical time zone for that particular device, that the data communications are to be routed to a different communications device of the client entity (e.g., a communications device associated with a different user). As another illustration, routing functions in the policy associated with the client entity can specify that while a communications device is outside of the typical time zone for that particular device, that the data communications are to be routed to a message recording system during non-business hours for the determined time zone. Additionally and/or alternatively, a user of a particular data communications device can provide additional and/or different routing processes to implement while the communications device is outside of the typical time zone for that particular device. The routing functions in the policy associated with the communications station can be in addition to, or replacement of, the routing functions in the policy associated with the client entity.

In various embodiments, the processing circuit automatically implements the client entity policy and/or the data communications station policy to route the data communication. In such embodiments, the client entity policy includes default communications routing policies to be implemented based on a change of time zone, and the data communications station policy includes user-configured routing policies, such as may be configured by a user of the communications station policy. For instance, a user can specify a window of time in which notifications for data communications are to be turned off (e.g., not received). In response to a determination that a local time at which the data communication is received by the respective data communications station is within a window of time specified in the policy associated with the respective data communications station policy and/or client entity policy, the processing circuit intercepts the data communication and provides a text-based virtual assistant to address the data communication.

The processing circuit 112 is further configured to route the data communication based on the time zone of the data communications station, and according to the respective set of routing functions associated with the respective data communications station. For instance, for each data communication routed by the processing circuit 112, the processing circuitry 112 can analyze the data communications from data communication devices 102 associated with a client account to determine if the calls and data transfers are outside of the typical area code, and if additional and/or different communication routing processes are to be implemented.

Embodiments in accordance with the present disclosure are not limited to a time-zone based routing feature and may include a geographic-based routing feature. In a number of embodiments, in addition to or alternatively to the time-zone routing feature, the processing circuitry 112 routes the data communication based on the geographic location of the data communications station associated with the client account, and according to the respective set of routing functions associated with the data communications station. The routing function may be triggered regardless or independent of the time zone change, with different routing functions of the set may be triggered responsive to the particular geographic location. For example, GPS data may indicate that the data communications station is at the office which may trigger a different routing function having different routing rules than when the data communications station is at the user's home. As a specific example, when the geographic location indicates the user is working remotely, e.g., is at home, calls may be routed to the data communications station that are from internal personal and/or extensions associated with the client, and not routed to the data communications station from external callers (e.g., routed to a voicemail or another user, or screen them with IVR). As another specific example and/or in addition to the above example, the different routing functions may define groups of people from which calls are made and which are to be routed to the data communications station and groups of people from which to not route the call. As a specific and non-limiting example, when the user is at home, calls or other data communications may be routed to the data communications station that are from executives but not from the rest of the global offices after hours and/or dependent on the location. In an additional specific example, the set of routing functions may include a sub-set of routing functions specific to or triggered based on the time zone change and a sub-set of routing functions triggered independent of the time zone and based on the geographic location. The routing functions may have rules for selecting one over the other, such as prioritization set by the client entity and/or user of the data communications station.

Figure 2:
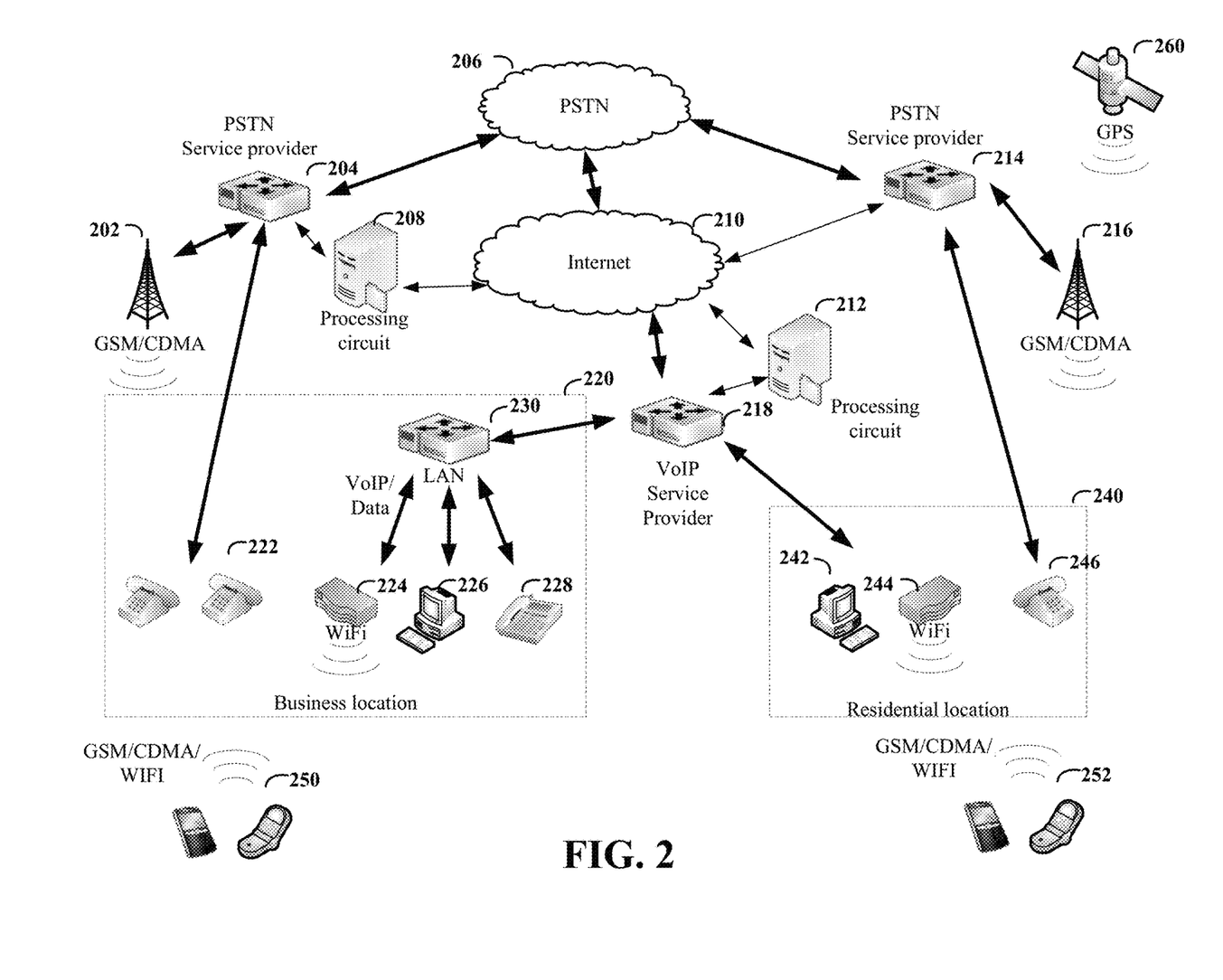
FIG. 2 illustrates an example data communications network, in accordance with the present disclosure.

FIG. 2 illustrates an example data communications network, in accordance with the present disclosure. The typical area code 220 and the other area code 240 (e.g., atypical area code) in FIG. 2 each include respective data communications devices 222/246, which send and receive data communications to service providers 204/214 in the respective locations. Each of the locations in this example also includes a respective cellular network 202/216, which provides phone calls from mobile devices 250/252 in the respective location to the service provider 204/214 in the respective location. The service providers route data communications via one or more networks 206. In this example, each of the locations further includes devices and circuits (e.g., WiFi access points 224/242 and LAN 230) to route data communications from data communications devices (e.g., mobile devices 250/252 computers 226/242, and IP phone 228) to a service provider 218. As discussed with reference to FIG. 1, the service provider 218 routes data communications over the one or more networks including the internet 210 and possibly over one or more networks 206.

Processing circuits 208/212 are configured to identify a respective set of routing functions in a policy associated with the respective data communications station, based on a time zone of the geographic location and/or based on the geographic location independent of the time zone and/or time zone change. As indicated above, in some embodiments, the processing circuits 208/212 are each configured to identify a respective set of routing functions in a policy associated with the respective data communications station, based on a time zone of the geographic location.

As one example, the probable geographic location of a communication device may be determined based on the particular service provider 204/214 or cellular network 202/216 used to transmit the data communication to the communication device. In the example shown in FIG. 2, if a call is placed with PSTN service provider 204 or cellular network 202, it is likely that the communication device is located within the typical area code 220.

In some embodiments, various characteristics of a geographic location can be measured by a device (e.g., mobile devices 250/252) and provided to the processing circuits 208/212 as metadata in a phone call or in a separate data packet. For instance, presence of WiFi access points 224/244 or cellular networks 202/216 may be used to determine the geographic location of a communication device. As another example, communication devices may be configured to determine a geographic location based on GPS signals received from GPS satellites 260 at the geographic location of the communication device.

Figure 3:
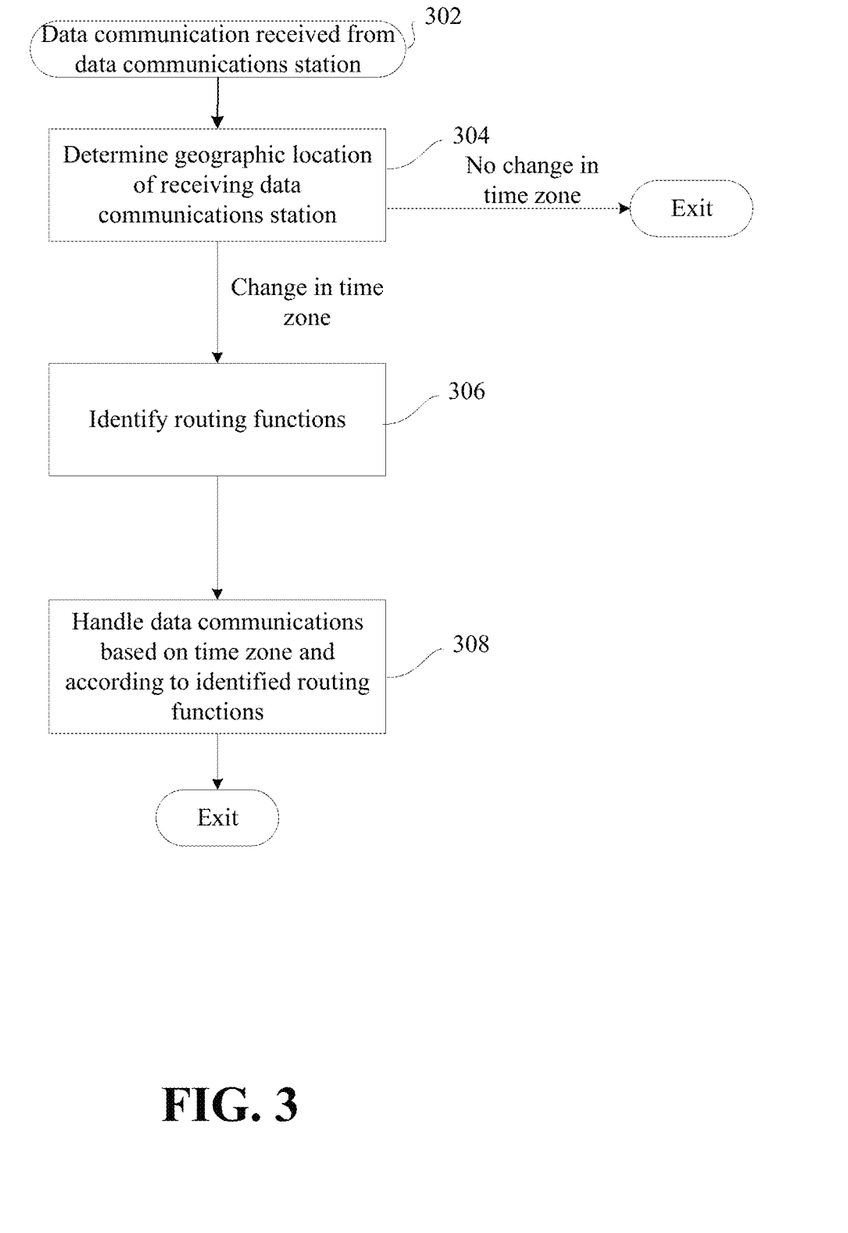
FIG. 3 shows a method for routing data communications based on time zone of the data communications station, consistent with one or more embodiments of the present disclosure.

FIG. 3 shows a method for routing data communications based on time zone of the data communications station, consistent with one or more embodiments of the present disclosure. In response to receiving a data communication 302 (e.g., at a service provider), a geographic location of the respective data communications station is determined at block 304. If the geographic location of the communications station is the same as the default (e.g., typical) geographic location of the device, then the process exits. If the geographic location of the communications station is not the same as the default (e.g., the geographic location of the communications station has changed), a respective set of routing functions in a policy associated with the respective data communications station is identified, based on a time zone of the geographic location 306. As described herein, a set of routing functions in a policy associated with the client entity include default communications routing policies to be implemented based on a change of time zone. Each respective data communications station can have a policy including user-configured routing policies to be implemented based on a change of time zone. The data communications are handled (e.g., routed) based on the time zone of the data communications station, and according to the respective set of routing functions associated with the respective data communications station 308, and the process exits. As described herein, the data communications can be sent to the data communications station, an alternative data communications station, to a messaging system, to an IVR system, and/or to another text-based virtual assistant for addressing and/or responding to the data communication. How the data communications are routed, can be specified by a respective set of routing functions included in the client entity policy and/or the data communications station policy.

Figure 4:
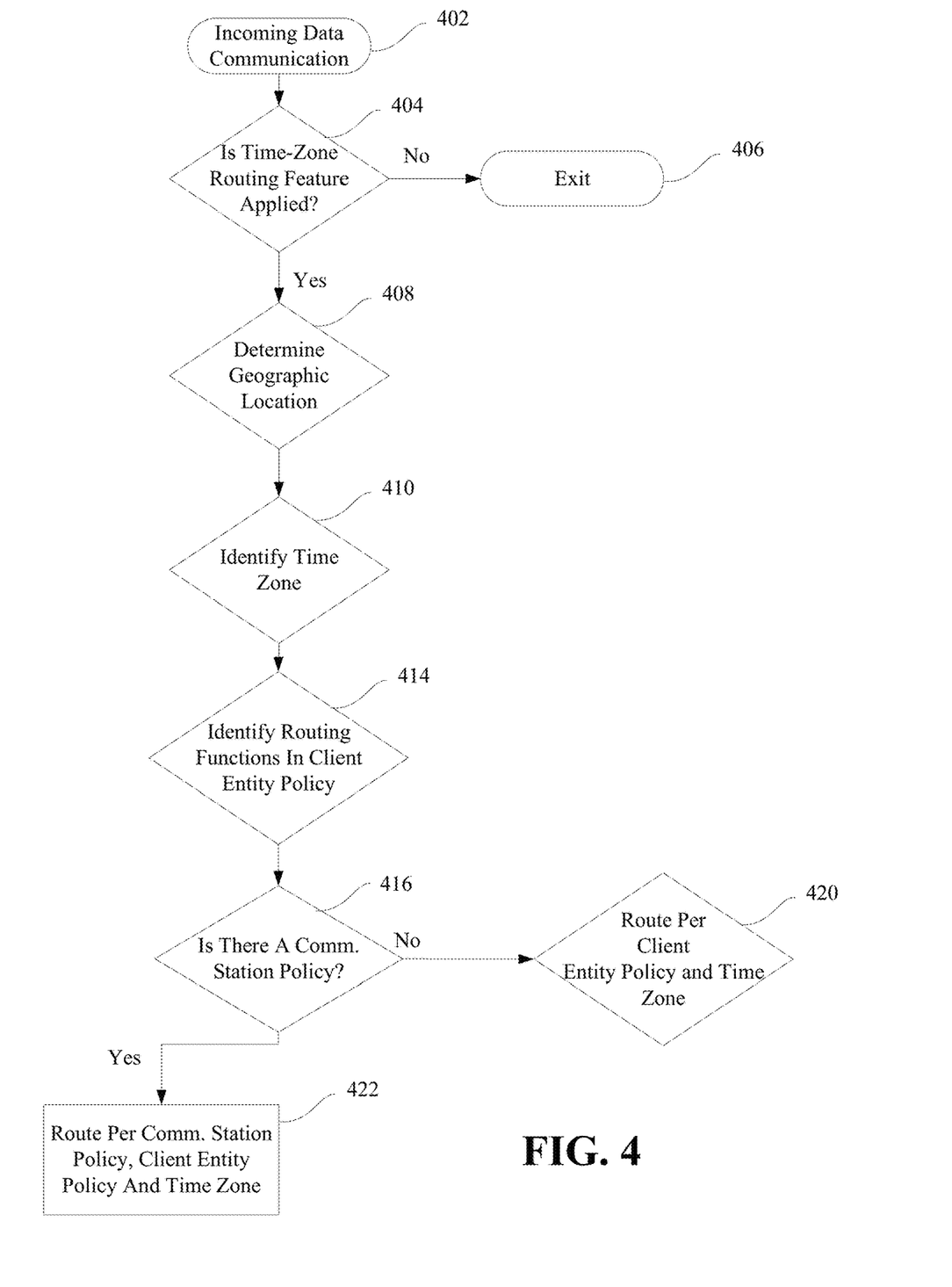
FIG. 4 shows an example process for routing data communications based on time zone of the data communications station, consistent with one or more embodiments of the present disclosure.

FIG. 4 shows an example process for routing data communications based on time zone of the data communications station, consistent with one or more embodiments of the present disclosure. As illustrated therein, the process begins with an incoming data communication 402. For instance, a communications routing circuit can be configured and arranged to receive and route data communications to a plurality of data communications stations and provide data communications services to a plurality of remotely-situated client entities, wherein each of the client entities is associated with a respective set from among the plurality of data communications stations. A processing circuit can be configured and arranged to log data communications routed by the communications routing circuit, and for each data communication routed by the communications routing circuit for a client entity in which a time-zone routing feature is applied, the processes described herein are applied. For instance, responsive to an incoming data communication 402, the processing circuit can identify whether the data communication is intended for a client entity in which a time-zone routing feature is applied at 404. If the time-zone routing feature is not applied for that client entity, the process exits at 406 and the data communication is routed using normal handling procedures. If, however, the time-zone routing feature is applied for that client entity, a geographic location of the respective data communications station is determined at 408. The geographic location of the data communications station can be determined by various methods, including GPS coordinates, presence of certain WiFi access points, presence of certain cellular networks, etc. From the geographic location of the data communications station, a local time zone is identified at 410. Additionally, a respective set of routing functions in a policy associated with the respective data communications station can be identified, based on a time zone of the geographic location at 414. As described herein, each client entity can specify different respective policies concerning how data communications are to be routed when data communications stations travel outside of their normal (e.g., defined) time-zone. Additionally, individual users associated with particular data communications stations can specify different and/or additional policies concerning how data communications are to be routed when the data communications stations travel outside of the normal (e.g., defined) time-zone. The communications station policy can replace and/or supplement aspects of the client entity policy. Accordingly, the processing circuit can be configured and arranged to determine if there is a communication station policy to be applied at 416. If not, then the data communication is routed based on the time zone of the data communications station, and according to the client entity policy at 420. If there is a communication station policy, then the data communication is routed based on the time zone of the data communications station, and according to the respective set of routing functions associated with the respective data communications station as well as the client entity at 422.

As previously described, in addition to or alternatively to the time-zone routing feature, embodiments in accordance with the present disclosure may be directed to methods and/or apparatuses for providing a geographic-based routing featuring involving routing data communications based on determined geographic locations of the data communications stations associated with the client account, and according to the respective set of routing functions associated with the data communications stations. The routing function may be triggered regardless of the time zone change, with different routing functions of the set may be triggered responsive to the particular geographic location and/or time zone changes.

Various blocks, modules or other circuits can be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, station, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (data communications) endpoint device (or endpoint) refers to or includes a communications circuit such as one enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity (aka "client station") refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A data-communications system, comprising:
   a communications routing circuit to receive and route data communications on behalf of a plurality of data communications stations and provide data communications services to a plurality of remotely-situated client entities respectively associated with certain of the plurality of data communications stations;
   a processing circuit to track or monitor data communications routed by the communications routing circuit, and for at least some of the data communications, the processing circuit is further to:
      determine, in response to receipt of a data communication intended for a respective one of the data communications stations of a client entity and occurring in a window of time corresponding to a time zone change, a geographic location of a respective data communications station from among the plurality of data communications stations; and
      in response to an assessment that accounts for a time zone of the geographic location, that accounts for a respective set of routing functions associated with the respective data communications station and that accounts for the window of time associated with the data communication, process the data communication by:
         routing the data communication to the respective data communications station under a condition indicated via the assessment that the data communication is not considered a disruptive time relative to the window of time, wherein in response to the data communication, the processing circuit is to identify a policy associated with the client entity, and automatically implement the policy for routing the data communication, and
         determining whether a specific nature or topic associated with the data communication requires that the data communication is to be sent directly to the respective data communications station regardless of the window of time.

2. The data-communications system of claim 1, wherein the processing circuit is to track or monitor the geographic location of the respective data communications station.

3. The data-communications system of claim 1, wherein the processing circuit is to generate the assessment based on the time zone and on the respective set of routing functions associated with the respective data communications station.

4. The data-communications system of claim 1, wherein in response to the data communication, the processing circuit is to process the data communication by routing the data communication based on a client entity policy that includes default communications routing policies to be implemented based on a change of time zone.

5. The data-communications system of claim 1, wherein the processing circuit is to process the data communication by routing the data communication based on a client entity policy indicating that a local time at which the data communication is received by the respective data communications station is within a window of time specified in the policy.

6. The data-communications system of claim 1, wherein the processing circuit is to process the data communication by providing a text-based virtual assistant in response to the condition, that the data communication is not considered a disruptive time relative to the window of time, is not satisfied.

7. The data-communications system of claim 6, wherein the processing circuit is to route the data communication to a messaging system in response to answers received by the text-based virtual assistant satisfying a set of criteria specified in the policy associated with the respective data communications station or a policy of the client entity.

8. The data-communications system of claim 6, wherein the processing circuit is to route the data communication to a different data communications station in response to answers received by the text-based virtual assistant satisfying a set of criteria specified in the policy associated with the respective data communications station or a policy of the client entity.

9. The data-communications system of claim 1, wherein in response to the data communication, the processing circuit is to use the geographic location of the respective data communications station for determining a local time associated with the data communication; and
    apply a different set of routing functions to the data communication based on the determined local time.

10. The data-communications system of claim 1, wherein the processing circuit is to, in response to a determination that a local time at which the data communication is received by the respective data communications station is within a specified window of time, intercept the data communication and provide an interactive voice recognition (IVR) system to address the data communication.

11. The data-communications system of claim 10, wherein the processing circuit is to route the data communication to a messaging system in response to answers received by the IVR system satisfying a set of criteria specified by a client entity associated with the respective data communications station.

12. The data-communications system of claim 1, wherein the processing circuit is to: identify the topic of the data communication or a sentiment of the data communication, determine a local time at which the data communication is received by data communications station, and route the data communication based on the determined local time.

13. The data-communications system of claim 12, wherein the processing circuit is to route the data communication based on: the identified topic or sentiment, the determined local time, and an importance indicator associated with the identified topic or sentiment.

14. The data-communications system of claim 12, wherein the processing circuit is to route the data communication based on: the identified topic or sentiment, the determined local time, an importance indicator associated with the identified topic or sentiment, and the respective set of routing functions associated with the data communications station.

15. The data-communications system of claim 1, wherein the processing circuit is to use machine learning to identify one or more topics or sentiments of the data communication.

16. A data-communications system, comprising:
    a communications routing circuit to receive and route data communications on behalf of a plurality of data communications stations and provide data communications services to a plurality of remotely-situated client entities respectively associated with a certain of the plurality of data communications stations;
    a processing circuit to track or monitor data communications routed by the communications routing circuit, and for at least some of the data communications, the processing circuit is further to:
        determine, in response to receipt of a data communication intended for a respective one of the data communications stations of a client entity and occurring in a window of time corresponding to a time zone change, a geographic location of a respective data communications station; and
        in response to an assessment that indicates the data communication pertains to an emergency alert for the geographic location of the data communications station, that accounts for a time zone of the geographic location, that accounts for a respective set of routing functions associated with the respective data communications station and that accounts for the window of time associated with the data communication, process the data communication by:
            overriding a routing policy associated with the data communications station that would have the data communication routed to the respective data communications station under a first condition indicated via the assessment that the data communication is not considered a disruptive time relative to the window of time, and
            routing the emergency alert to the data communications station; and
        in response to the data communication and under another condition different than the first condition, processing the data communication by routing the data communication based on a client entity policy that includes one or more default communications routing policies to be implemented based on one or more changes of time zone.

17. The data-communications system of claim 16, wherein the processing circuit is to track or monitor the geographic location of the respective data communications station.

* * * * *